United States Patent [19]

Swett et al.

[11] 3,825,049

[45] July 23, 1974

[54] FOOD GRATER
[75] Inventors: James B. Swett; Harold P. Ashton, both of Providence, R.I.
[73] Assignee: Dart Industries Inc., Los Angeles, Calif.
[22] Filed: July 13, 1972
[21] Appl. No.: 271,449

Related U.S. Application Data
[62] Division of Ser. No. 102,623, Dec. 30, 1970, Pat. No. 3,698,460.

[52] U.S. Cl. ..................... 150/.5, 220/70, 220/94 A
[51] Int. Cl. ............................................. B65d 37/00
[58] Field of Search .......... 150/.5; 220/94 A, 69, 70

[56] References Cited
UNITED STATES PATENTS
1,394,540 10/1921 Diack .............................. 150/.5 UX
2,793,788 5/1957 Lysne .............................. 220/1.5 X Primary Examiner—Willie G. Abercrombie

[57] ABSTRACT
A Food Grater including a unique bowl having at least one handle and at least one flattened planar portion at the side of the bowl. The outermost extent of the handle is in the same plane as the flattened planar portion so the bowl can be held in a tilted position and rested on the outermost extent of the handle and the planar portion without rolling. The bowl is also provided with spaces to accept projections on a mating grater element so that the grater element will not rotate on the bowl when the grater is being used.

The grater element is divided into separate grating surfaces, some of which are in separate parallel planes. The separation helps prevent the fingers from being scraped on a nearby unused surface. The grater blades on some of the surfaces face in opposite directions from the grater blades on other surfaces so that a portion of the blades can be used when the grater element is in one position and the remainder can be used when the element is inverted. A unique plastic slicer is provided which has a substantially sinusoidal edge which permits the plastic slicer to be used where metal slicers were formerly required.

3 Claims, 9 Drawing Figures

PATENTED JUL 23 1974  3,825,049
SHEET 1 OF 4
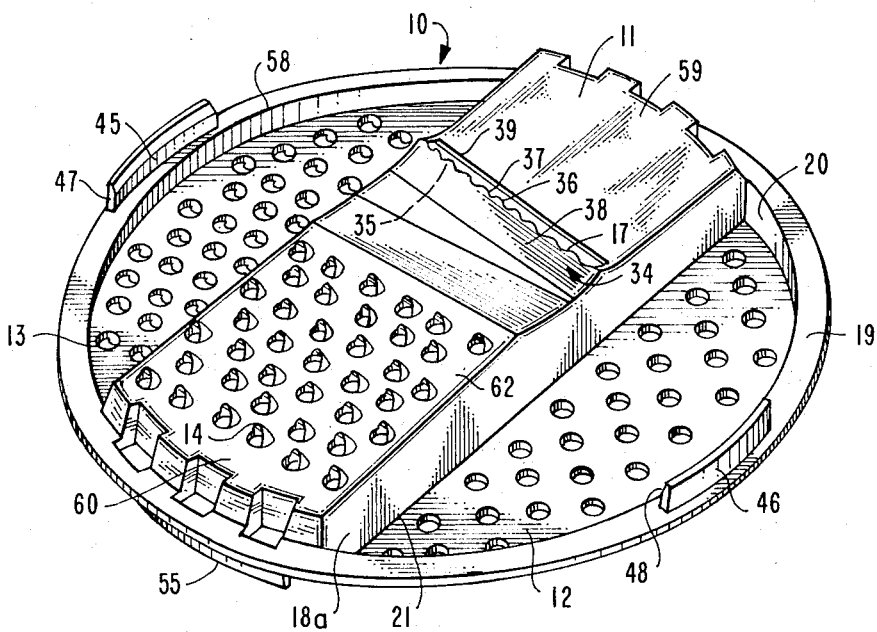
FIG.—1
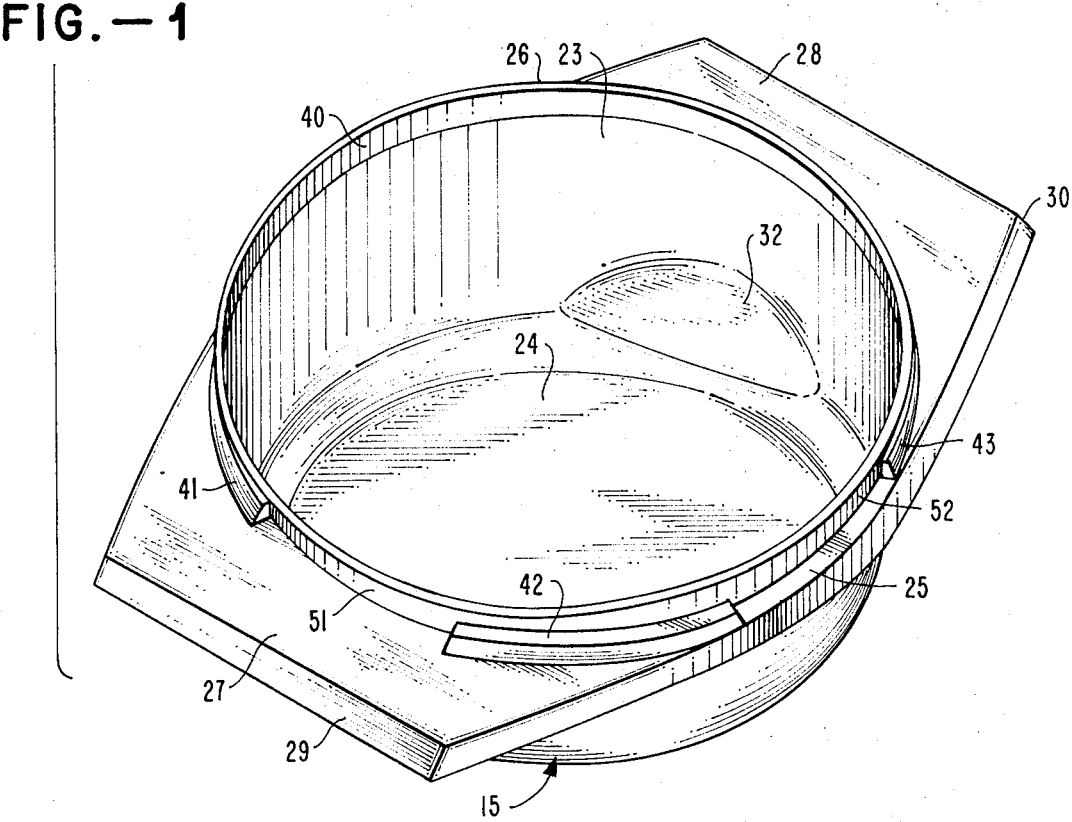

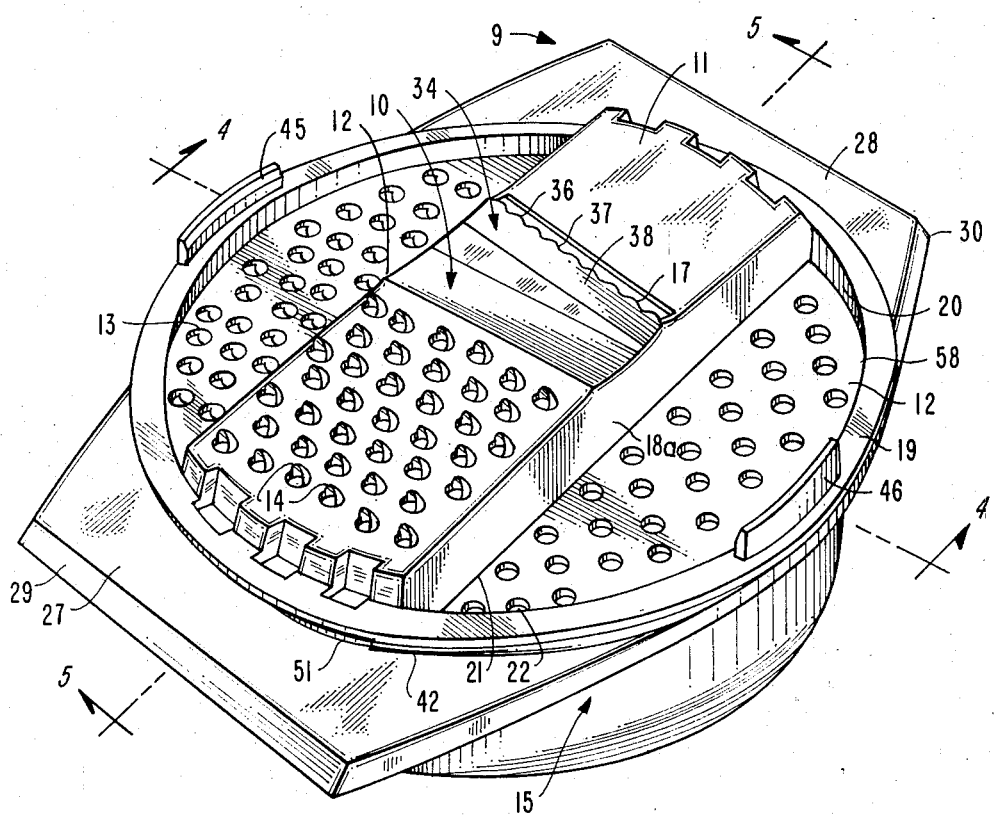
FIG.—2
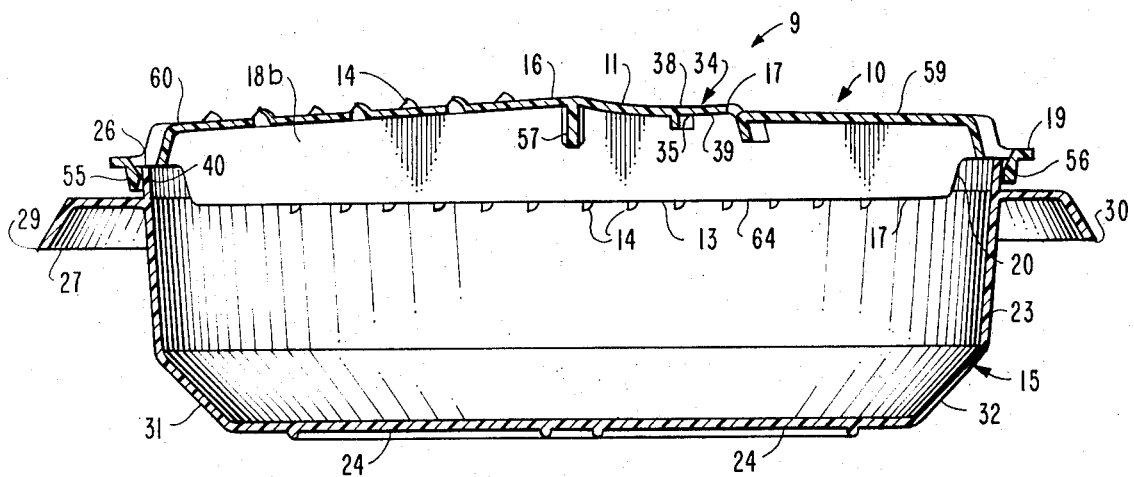
FIG.—5

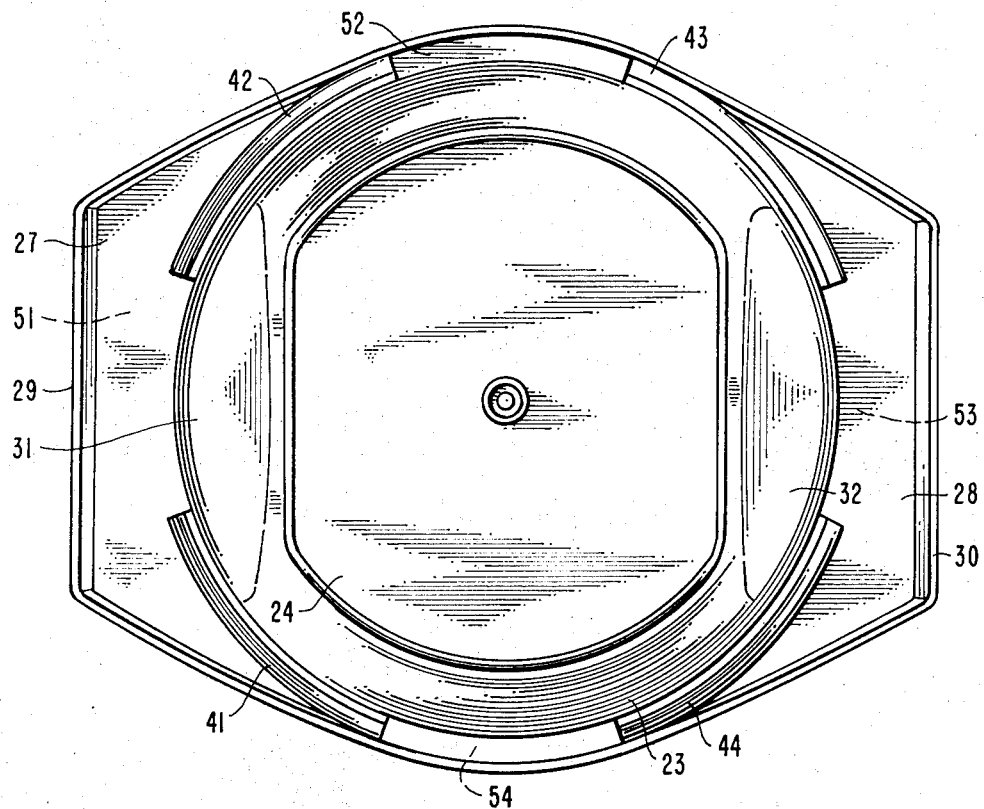
FIG. — 3
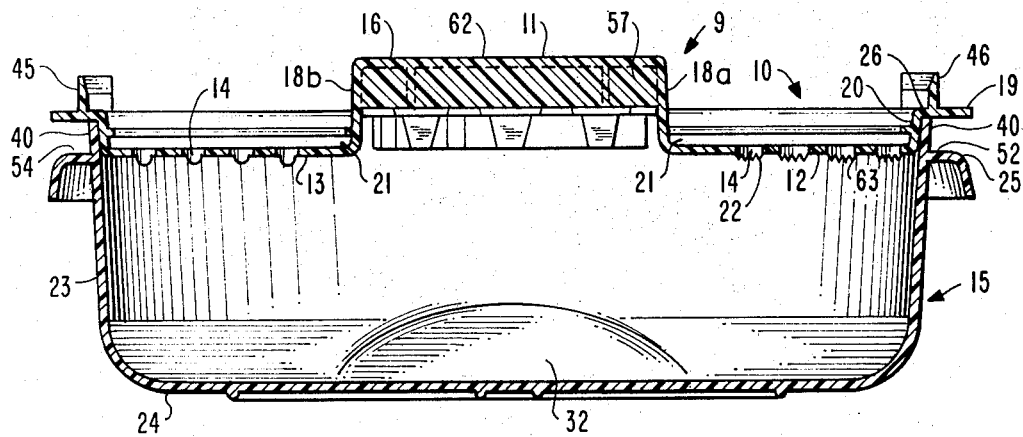
FIG. — 4

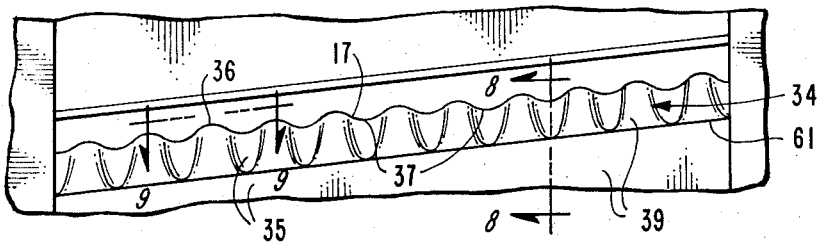
FIG.—7
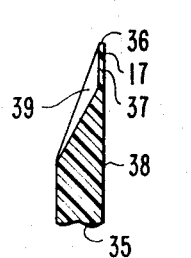
FIG.—8
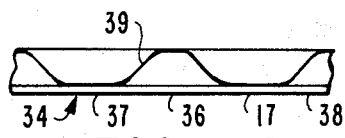
FIG.—9
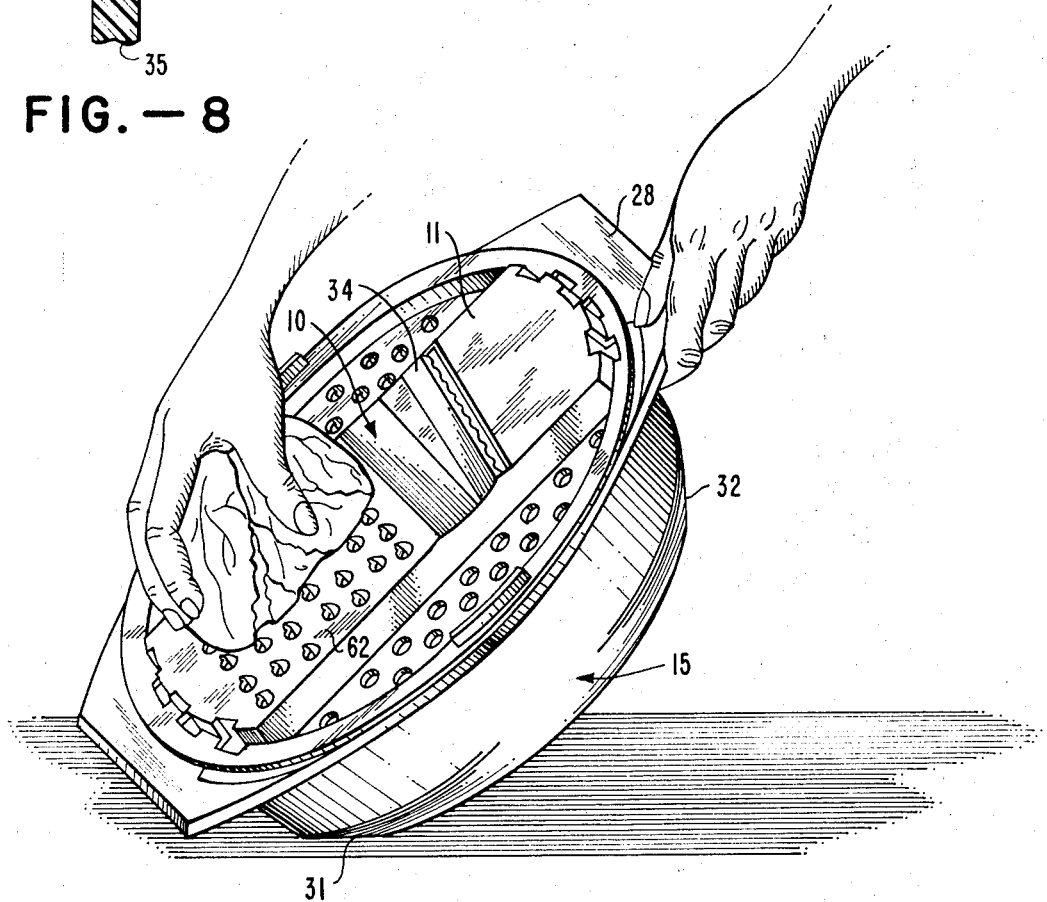
FIG.—6

FOOD GRATER

This is a division of application Ser. No. 102,623, filed Dec. 30, 1970, now U.S. Pat. No. 3,698,460.

BACKGROUND OF THE INVENTION a. Field of the Invention

This invention relates generally to food graters and relates more particularly to an improved food grater manufactured from plastic material.

b. History of the Prior Art

In the prior art, food graters were generally made of ferrous or other metallic materials. Graters made of metallic materials were generally unsatisfactory in that the grater would rust or corrode thus destroying the cutting edges, making the grater unpleasant to look at, causing the grater to deposit corroded particles in the food and permitting the grater to harbor bacteria in the corroded surface. Metallic graters likewise inherently had extremely sharp cutting and scraping edges which frequently ripped and cut the fingers upon even light contact of the fingers with the grating or cutting surface. Metallic graters likewise had a tendency to stick to foods such as cheese making the food hard to slice or grate and making the grater difficult to clean.

In order to avoid some of the disadvantages of metallic graters, attempts were made to replace metallic graters with plastic graters. These attempts were only partially successful because it was believed in the prior art that a plastic grater could not be provided with a slicer having a plastic edge which would be as effective as a metallic slicer.

In addition, both metallic and plastic prior art food graters had other disadvantages. The graters were not generally provided with mating bowls to collect the sliced or grated material and those that had mating bowls did not engage the bowls in a way which prevented rotation or other motion by the grater element when it was being used and the bowls could not be tilted when the grater element was being used without rolling upon the working surface.

Some food graters in the prior art and particularly those provided with collecting bowls were also hard on fingers because it was easy to scrape the fingers on a nearby grating surface while a different grating surface was being used.

BRIEF DESCRIPTION OF THE INVENTION

The invention is a food grater which is made of plastic materials. The grater is provided with a plastic bowl which may be of any suitable plastic material and a grater element which is preferably manufactured from ABS and which snaps onto the bowl in a manner which prevents rotation of the greater element on the bowl. The plastic grating areas which may be substantially planar do not readily stick to the materials which are grated and are therefore easily cleaned. The bowl is provided with at least one outwardly extending handle portion which in conjunction with at least one flattened portion of the bowl permits the bowl and grater element to be tilted in a relatively stable position which prevents the bowl from rolling on the working surface. The handle can also rest on the working surface with the bowl below the edge of the surface which permits the bowl to be stably held against the edge of the working surface.

The grater element may have a plurality of grating or cutting areas which may be in different planes or may face in opposing directions. The use of grating areas which are in separate planes or which face in opposing directions permits the areas to be separated to minimize scrapes and cuts on the fingers which result from accidentally scraping against other grating areas.

The grater is provided with a slicer blade and grater blades which are made entirely of plastic materials and are preferably ABS. The plastic slicer blade has a unique edge in the shape of a sinusoidal curve which permits good slices of food to be obtained and which permits long wear.

BRIEF DESCRIPTION OF THE DRAWINGS

FIG. 1 is an exploded top perspective view showing the bowl and grater element.

FIG. 2 is a top perspective view showing the grater element assembled upon the bowl.

FIG. 3 is a bottom plan view of the bowl.

FIG. 4 is a cross sectional view taken on line 4—4 of FIG. 2.

FIG. 5 is a cross sectional view taken on line 5—5 of FIG. 2.

FIG. 6 is a perspective view of the food grater as it might appear during use.

FIG. 7 is an exploded bottom plan view of the slicer blade.

FIG. 8 is a cross sectional view of the slicer blade along line 8—8 of FIG. 7.

FIG. 9 is a view of the edge of the slicer taken along line 9—9 of FIG. 7.

PREFERRED EMBODIMENT

Referring now to the drawings and particularly FIGS. 1, 2, 3, 4 and 5, food grater 9 is provided with a bowl 15 and a mating reversible grater element 10. Materials which are grated will pass through element 10 and be collected in bowl 15.

Grater element 10 includes at least first and second and preferably a third separate grating walls 11, 12 and 13. First wall 11 is in a different mathematical plane, than the remaining walls 12 and 13. First and second walls 11 and 12 are connected by at least one supporting sidewall 18a and first and third walls 11 and 13 are connected by at least one supporting sidewall 18b. Grating walls 11, 12 and 13 are provided with grating surfaces 62, 63 and 64 respectively.

The grater blades 14 on all grating surfaces project outwardly and when blades 14 on surface 62 of wall 11 project upwardly blades 14 on surfaces 12 and 13 project downwardly so that when food grater element 10 is inverted the plane of walls 12 and 13 is elevated with respect to the plane of wall 11 and grater blades 14 on walls 12 and 13 project upwardly. Two features help to prevent the fingers from being scratched or cut upon nearby grating or cutting areas. Since the grating areas are in different planes, the fingers will not easily contact another grating wall and even if another grating wall is contacted, the chance of being cut or scraped is minimized since the grating areas face in opposing directions, thus the relatively smooth side of the grating wall rather than the grating or cutting portion of the grating wall is likely to be contacted.

Reversible food grater element 10 is preferably defined by an annular outwardly extending flange 19 and a sidewall 20 which downwardly extends from the inner edge 58 of flange 19. Preferably grating walls 12 and 13 are integral with sidewall 20 and except for grater blades 14 are substantially planar and may be circular segments. Each wall 12 and 13 has a defining edge 21 and 22 which may be the cord of a circle which cord is shorter than the diameter of element 10 if element 10 is circular and which defining edge is substantially parallel to and spaced from the defining edge of the remaining wall 12 or 13.

In the preferred embodiment, the outwardly extending flange 19 of the grater element is provided with undercut outwardly extending projections 45 and 46 and undercut projections 55 and 56, which extend outwardly in a direction opposed to the direction of extension of projections 45 and 46. Outwardly extending projections 55 and 56 are adapted to snap over a peripheral rim on the bowl, each within one of the spaces 51, 52, 53 and 54 provided on the bowl and projections 45 and 46 are likewise adapted to snap over rim 40 within one of the spaces 51, 52, 53 and 54 when grater element 10 is inverted. The advantage of this structure is that grater element 10 is securely held to bowl 15 and is not permitted to rotate on the bowl. In addition, element 10 may be removed, rotated and secured to the bowl in a different position by snapping the projections into different spaces to obtain a more advantageous grating angle in relation to the bowl for the particular material being grated and for the particular working surface upon which the bowl rests.

The bowl 15 preferably comprises a bottom wall 24 and an integral sidewall 23 which may be linear or curved and is preferably closed and circular. In the preferred embodiment, sidewall 23 is provided with an outwardly flared upwardly extending peripheral rim 40 proximate top edge 26 of sidewall 23. The sidewall may be further provided with an integral outwardly extending peripheral flange 25 proximate top edge 26 but may be below rim 40, to facilitate the use of the rim to engage grater element 10. Flange 25 is provided with a plurality of integral spaced angular surfaces 41, 42, 43, and 44 which are also integral with rim 40. The ends of the angular surfaces define a plurality of spaces 51, 52, 53 and 54.

Peripheral flange 25 of bowl 15 may form at least one and preferably two handle portions 27 and 28 which are preferably opposed. Each handle portion is provided with an outermost extent 29 and 30 respectively, each outmost extent being at least two points which are equidistant from sidewall 23. Sidewall 23 is provided with at least one and preferably two planar surfaces 31 and 32, one of the outermost extents of one of the handles being in the same mathematical plane as one of the planar surfaces. The other outermost extent of the other handle is in the same mathematical plane as the other planar surface. One of the mathematical planes is represented as working surface 33 as seen in FIG. 6.

Having the outermost extent of a handle in the same plane as one of the planar surfaces 31 and 32 permits the grater to be held at an angle as shown in FIG. 6, while the grater is being used so that the bowl and grater do not roll upon the working surface.

In the preferred embodiment, as best seen in FIG. 5, first grating wall 11 is provided with a slight central peak 16 which divides wall 11 into two sections 59 and 60. The separation of wall 11 by peak 16 reduces the likelihood that the fingers will be scraped upon a section that is not being used. A re-enforcing wall 57 is integral with sections 59 and 60 at peak 16 and helps to support the sections.

As seen in FIGS. 1 and 5, grating element 10 is provided with a plastic slicer 34 which is preferrably on one of the sections 59 and 60, at an angle of from about 60° to about 85° from the longitudinal axis of the section. The angle increases slicing efficiency as does the slight upward angle of the element from about 5° to about 20° from the surface of the section. Plastic slicer 34 is provided with a cutting edge 17 and a supporting portion 35. As best seen in FIG. 7, cutting edge portion 17 is preferably substantially in the shape of a sinusoidal curve having maximum amplitudes 36 and minimum amplitudes 37. As seen in FIG. 8, the supporting portion 35 is provided with upper and lower surface 38 and 39 respectively which are joined by edge 17. Upper surface 38 is substantially planar and lower surface 39 slants toward uppersurface 38. The slant of the lower surface 39 begins at a substantially straight line 61, seen in FIG. 7, and terminates at the sinusoidal cutting edge 17 best seen in FIGS. 7, 8 and 9. Lower surface 39 slants toward upper surface 38 from line 61 at a lesser angle to upper surface 38 where lower surface 39 is directed toward a portion of cutting edge 17 having a larger amplitude and lower surface 39 directed toward upper surface 38 from line 61 at a greater angle to upper surface 38 where lower surface 39 is directed toward a portion of the cutting edge having lesser amplitude. The resulting lower surface 39 has a scalloped wavy appearance as it slants toward sinusoidal cutting edge 17.

The resulting plastic cutting edge operates effectively and efficiently for a longer period than some metal edges. Metal edges in the prior art actually seem to become dull in less time than the plastic edge herein discussed. The resulting plastic edge efficiently cuts carrots, cheese, potatoes and other foods. It was discovered by the applicants that a long wearing efficient plastic blade resulted when the edge was given a definite thickness of from about 0.005 to 0.02 of an inch. The edge in the preferred embodiment is about 0.01 of an inch thick.

What is claimed is:

1. A bowl comprising a sidewall and an integral bottom wall, said sidewall being provided with at least one outwardly extending handle portion proximate the upper edge of said sidewall, the outermost extent of said handle portion being at least two points which are substantially equidistant from said sidewall, said sidewall being provided with at least one planar surface, said planar surface being in a mathematical plane passing through said two points in said handle.

2. The bowl of claim 1 wherein said handle is an integral part of a continuous outwardly extending peripheral flange.

3. A bowl comprising a closed curved sidewall and an integral bottom wall, said sidewall being provided with an outwardly extending flange proximate its upper edge, said flange forming at least one handle portion the outermost extent of said handle portion being at least two points which are equidistant from said sidewall, said curved sidewall being provided with at least one planar surface, said two points of said handle portion being in the same mathematical plane as said planar surface.

* * * * *